(12) United States Patent
Hickman

(10) Patent No.: US 10,696,425 B2
(45) Date of Patent: Jun. 30, 2020

(54) SYSTEM FOR IMPARTING LINEAR MOMENTUM TRANSFER FOR HIGHER ORBITAL INSERTION

(71) Applicant: The Aerospace Corporation, El Segundo, CA (US)

(72) Inventor: Robert Alan Hickman, Chapel Hill, NC (US)

(73) Assignee: The Aerospace Corporation, El Segundo, CA (US)

( * ) Notice: Subject to any disclaimer, the term of this patent is extended or adjusted under 35 U.S.C. 154(b) by 622 days.

(21) Appl. No.: 15/591,726

(22) Filed: May 10, 2017

(65) Prior Publication Data

US 2017/0327250 A1    Nov. 16, 2017

Related U.S. Application Data

(63) Continuation-in-part of application No. 14/973,793, filed on Dec. 18, 2015, now abandoned, which is a
(Continued)

(51) Int. Cl.
*B64G 1/24* (2006.01)
*B64G 1/64* (2006.01)
(Continued)

(52) U.S. Cl.
CPC ............. *B64G 1/242* (2013.01); *B64G 1/002* (2013.01); *B64G 1/005* (2013.01); *B64G 1/007* (2013.01); *B64G 1/40* (2013.01); *B64G 1/405* (2013.01); *B64G 1/646* (2013.01); *B64G 1/648* (2013.01); *B64G 1/36* (2013.01); *B64G 1/402* (2013.01)

(58) Field of Classification Search
CPC ...... B64G 1/648; B64G 1/1078; B64G 1/646; B64G 1/64; B64G 1/007; F41H 11/02
See application file for complete search history.

(56) References Cited

U.S. PATENT DOCUMENTS 2,193,312 A    3/1940  Cobham et al.
3,201,065 A *  8/1965  Dunn ................... B64G 1/646
                                                    244/172.4
(Continued)

FOREIGN PATENT DOCUMENTS

EP    2671805 A1    12/2013

OTHER PUBLICATIONS

"The Rocket/Skyhook Combination," by F. Burke Carley and Hans P. Moravec, L5 News, Mar. 1983, http://www.nss.org/settlement/L5news/1983-skyhook.htm (last accessed Aug. 6, 2013).
(Continued)

*Primary Examiner* — Assres H Woldemaryam
(74) *Attorney, Agent, or Firm* — LeonardPatelPC

(57) ABSTRACT

A system for imparting linear momentum transfer may include a catching mechanism of a target space vehicle and a tether that is configured to impart a linear momentum transfer from the tether to the target space vehicle. The tether may be fixedly or detachably connected to a Kinetic Energy Storage and Transfer (KEST) vehicle that maneuvers and potentially retrieves the tether. Alternatively, the tether may be separate from the KEST vehicle and may be retrieved by a suitable retrieving mechanism, such as a robotic arm.

16 Claims, 8 Drawing Sheets

Related U.S. Application Data continuation of application No. 13/963,025, filed on Aug. 9, 2013, now Pat. No. 9,260,204.

(51) Int. Cl.
| | | |
|---|---|---|
| *B64G 1/40* | (2006.01) | |
| *B64G 1/00* | (2006.01) | |
| *B64G 1/36* | (2006.01) | |

(56) References Cited

U.S. PATENT DOCUMENTS

| | | | | |
|---|---|---|---|---|
| 3,241,145 | A * | 3/1966 | Petrides | B64C 39/022 |
| | | | | 343/705 |
| 3,465,986 | A * | 9/1969 | Milly | B64G 1/646 |
| | | | | 244/172.4 |
| 3,478,986 | A * | 11/1969 | Fogarty | B64G 1/12 |
| | | | | 244/159.4 |
| 4,712,753 | A | 12/1987 | Howard | |
| 4,750,692 | A * | 6/1988 | Howard | B64G 1/648 |
| | | | | 102/504 |
| 5,082,211 | A | 1/1992 | Werka | |
| 5,163,641 | A | 11/1992 | Yasaka | |
| 5,279,482 | A | 1/1994 | Dzenitis et al. | |
| 5,806,232 | A | 9/1998 | James | |
| 6,116,544 | A | 9/2000 | Forward et al. | |
| 6,431,497 | B1 * | 8/2002 | Hoyt | B64G 1/648 |
| | | | | 244/158.2 |
| 6,866,232 | B1 | 3/2005 | Finney | |
| 6,945,499 | B1 | 9/2005 | Robinson | |
| 7,854,087 | B1 | 12/2010 | Pervez | |
| 9,260,204 | B2 | 2/2016 | Hickman | |
| 2003/0183726 | A1 * | 10/2003 | Lounge | B64G 1/1078 |
| | | | | 244/172.4 |
| 2005/0067524 | A1 | 3/2005 | Johansen | |
| 2005/0103939 | A1 | 5/2005 | Bischof et al. | |
| 2005/0103940 | A1 | 5/2005 | Bischof et al. | |
| 2006/0145024 | A1 | 7/2006 | Kosmas | |
| 2007/0125910 | A1 * | 6/2007 | Cepollina | B64G 1/007 |
| | | | | 244/172.6 |
| 2008/0099624 | A1 | 5/2008 | Evjenth | |
| 2010/0038491 | A1 * | 2/2010 | Cepollina | B64G 1/1078 |
| | | | | 244/172.5 |
| 2010/0051750 | A1 | 3/2010 | Dempsey | |
| 2010/0072321 | A1 | 3/2010 | Lenard | |
| 2010/0193640 | A1 * | 8/2010 | Atmur | B64G 1/242 |
| | | | | 244/158.2 |
| 2010/0237183 | A1 | 9/2010 | Wilson et al. | |
| 2011/0036952 | A1 | 2/2011 | Moorer et al. | |
| 2011/0153210 | A1 | 6/2011 | Stimac et al. | |
| 2011/0153211 | A1 | 6/2011 | Stimac et al. | |
| 2011/0192936 | A1 | 8/2011 | Knirsch | |
| 2011/0272528 | A1 | 11/2011 | Maiboroda | |
| 2012/0117938 | A1 | 5/2012 | Barral et al. | |
| 2012/0210904 | A1 | 8/2012 | Merems | |
| 2012/0292449 | A1 * | 11/2012 | Levin | B64G 1/00 |
| | | | | 244/158.2 |
| 2013/0075534 | A1 * | 3/2013 | Taylor | B64G 4/00 |
| | | | | 244/158.2 |
| 2013/0140403 | A1 | 6/2013 | Goff et al. | |
| 2013/0175401 | A1 * | 7/2013 | Starke | B64G 1/1078 |
| | | | | 244/171.1 |
| 2015/0151856 | A1 * | 6/2015 | Reed | B64G 1/1078 |
| | | | | 244/158.4 |
| 2017/0210495 | A1 * | 7/2017 | Arwood | B64G 1/648 |

OTHER PUBLICATIONS

USPTO, "Non-Final Office Action" dated Jun. 24, 2016 for U.S. Appl. No. 14/973,793.

USPTO, "Final Office Action", dated Sep. 21, 2016 for U.S. Appl. No. 14/973,793.

Bisbos.com, Profac, https://www.bisbos.com/space_n_profac.html, accessed Aug. 18, 2015; archived by Internet Archive on Jan. 24, 2012, https://web.archive.org/web/20120124234915/http://www.bisbos.com/space_n_profac.html.

David P. Stem and Dr. Mauricio Peredo, "The Space Tether Experiment", http://www-spof.gsfc.nasa.gov/Education/wtether.html, last updated Nov. 25, 2001; accessed Aug. 19, 2015.

E. Sarmont, "How an Earth Orbiting Tether Makes Possible an Affordable Earth-Moon Space Transportation System," SAE Technical Paper 942120 (1994).

G. Tyc et al., "Flight dynamics results from the OEDIPUS-C tether mission", AIAA/AAS Astrodunamics Conference, San Diego CA Jul. 29-31, 1996. Collection of Technical Papers (A96-34712 09-12), 1996, pp. 39-50. AIAA Paper 96-3573.

Notice of Allowance issued in U.S. Appl. No. 13/963,025 dated Oct. 13, 2015.

Paul Lucas, "Cosmic Rope Tricks: Space Tethers and Rotovators", article issued on Apr. 14, 2003.

Restriction Requirement issued in U.S. Appl. No. 14/963,830 dated May 5, 2017.

USPTO, "Final Office Action" dated Sep. 1, 2015 for U.S. Appl. No. 13/963,025.

USPTO, "Non-Final Office Action" dated Jul. 17, 2015 for U.S. Appl. No. 13/963,025.

USPTO, "Non-Final Office Action", dated Mar. 6, 2017 for U.S. Appl. No. 14/973,793.

Robert P. Hoyt, "Design and Simulation of a Tether Boost Facility for Leo-GTO Transport", issued in Tethers Unlimited, Inc., Seattle, Washington.

Robert P. Hoyt, "Responsive Launch of Small Spacecraft Using Reusable In-Space Tether and Air-Launch Technologies", issued in Tethers Unlimited, Inc., Bothell, WA.

Robert P. Hoyt, "Stabilization of Electrodynamic Space Tethers", issued in Tethers Unlimited, Inc.

The Alna Space Program, Atmospheric Harvesting, http://www.alnaspaceprogram.org/blog/?p=25, posted Sep. 28, 2011, accessed Aug. 18, 2015.

The Alna Space Program, Tethers as momentum exchange devices (Studies on Tethers), http://alnaspaceprogram.org/cable.html, 2011-2012; accessed Aug. 18, 2015; archived by Internet Archive on Jan. 4, 2013, https://web.archive.org/web/20130104171354/http://alnaspaceprogram.org/cable.html.

Wikipedia page "Fishing Line", archieved by Internet Archive on Jan. 17, 2010. https://web.archive.org/web/20100117170251/http://en.wikipedia.org/wiki/Fishing_line, accessed on Jul. 12, 2015.

Wikipedia page, "Inelastic collision" achieved by Internet archive on Jun. 20, 2016, https://en.wikipedia.org/wiki/Inelastic collision.

Wikipedia, "Inelastic collision", https://en.wikipedia.org/wiki/Inelastic_collision, accessed on Sep. 7, 2016.

Notice of Allowance issued in U.S. Appl. No. 14/963,830 dated Dec. 12, 2017.

USPTO, "Non-Final Office Action", dated Jul. 14, 2017, U.S. Appl. No. 14/963,830.

\* cited by examiner

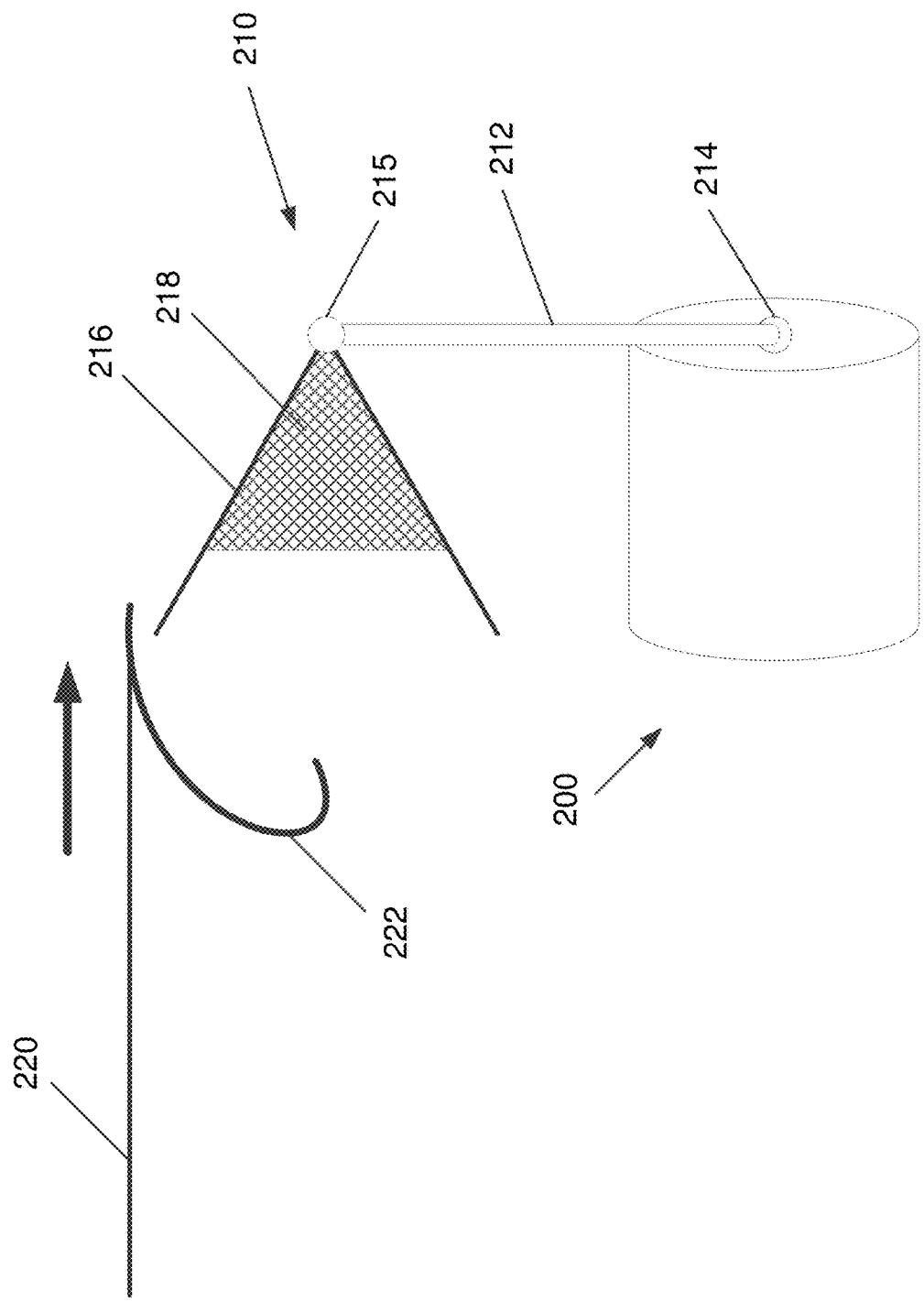

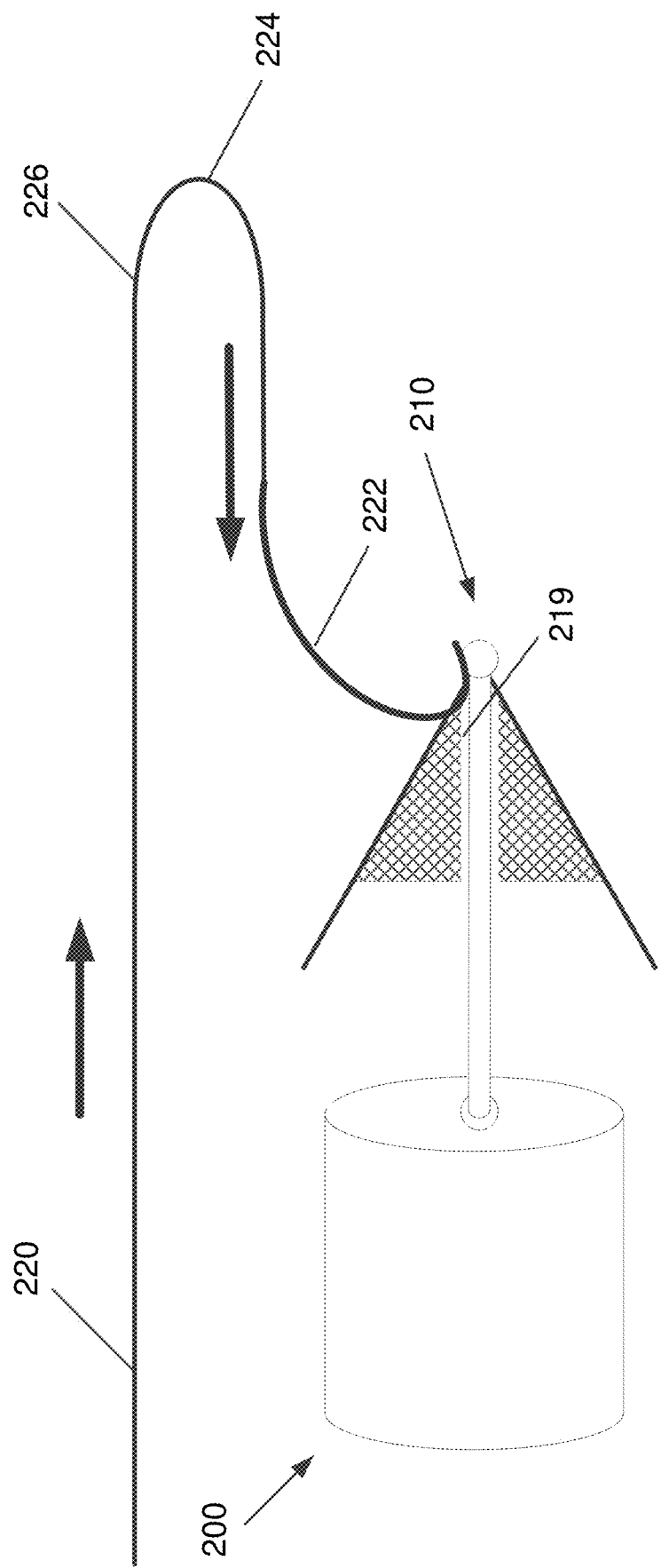

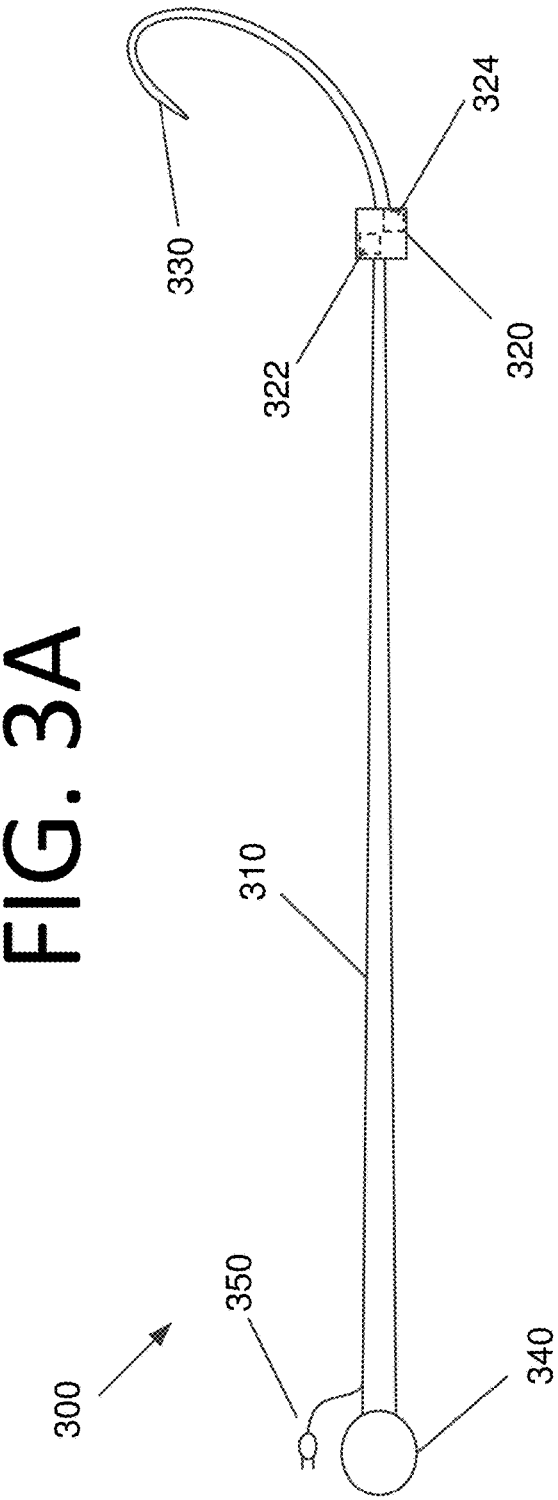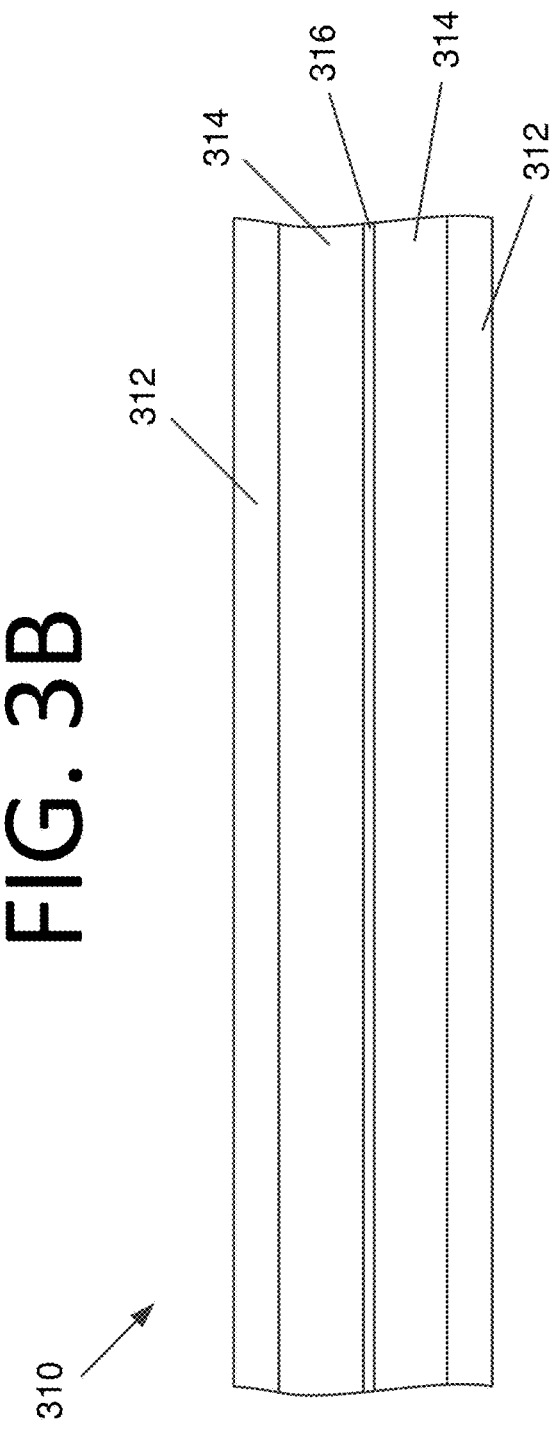

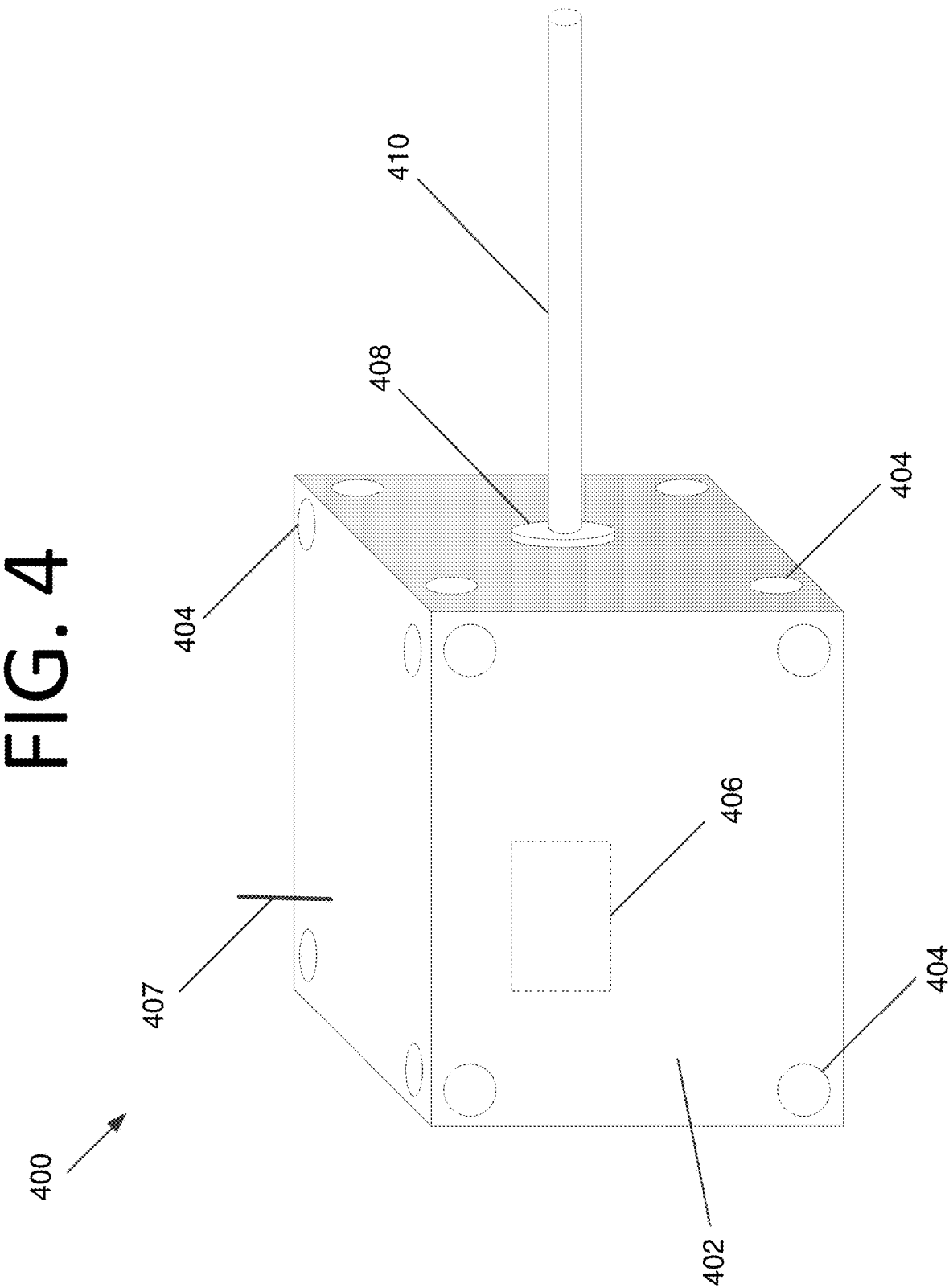

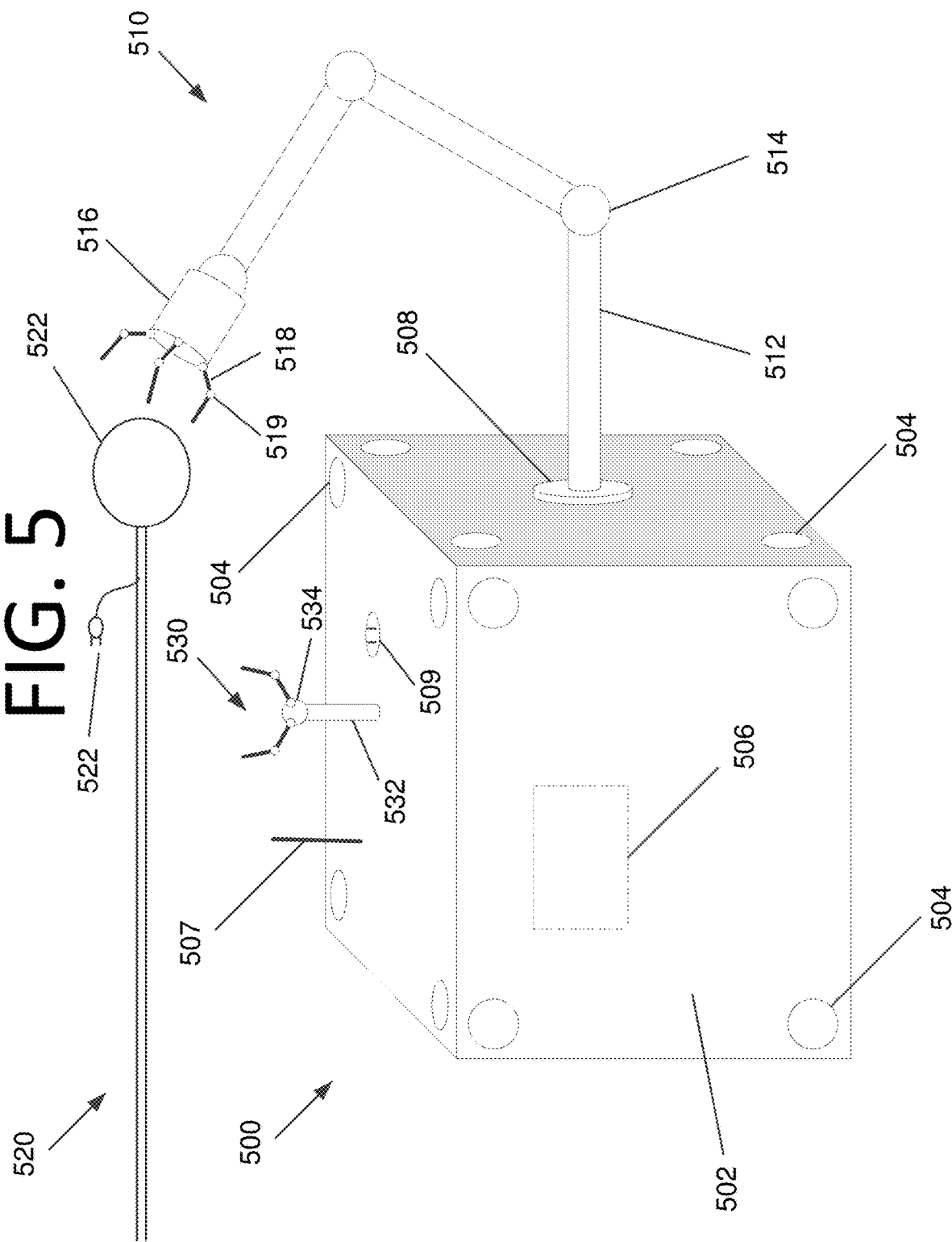

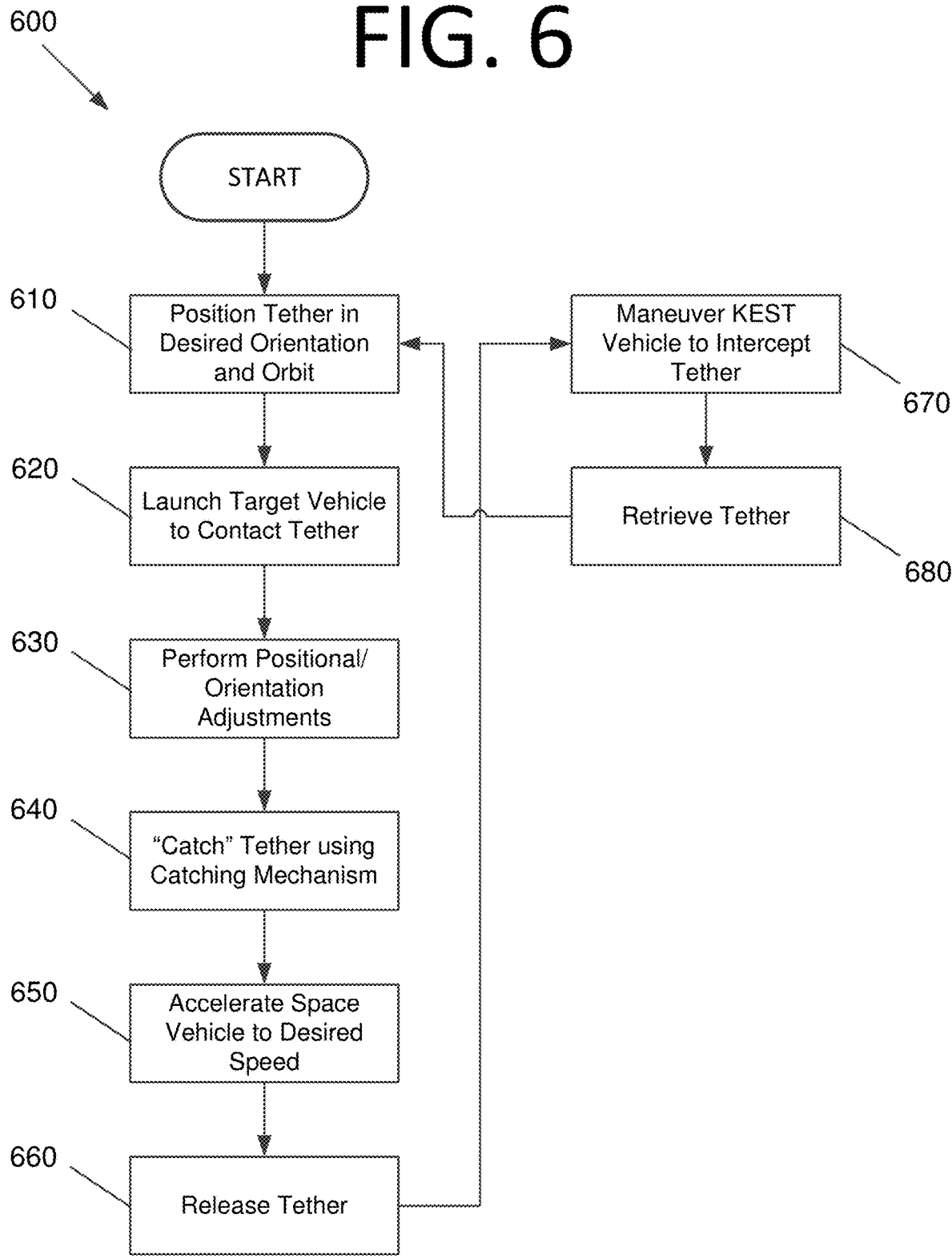

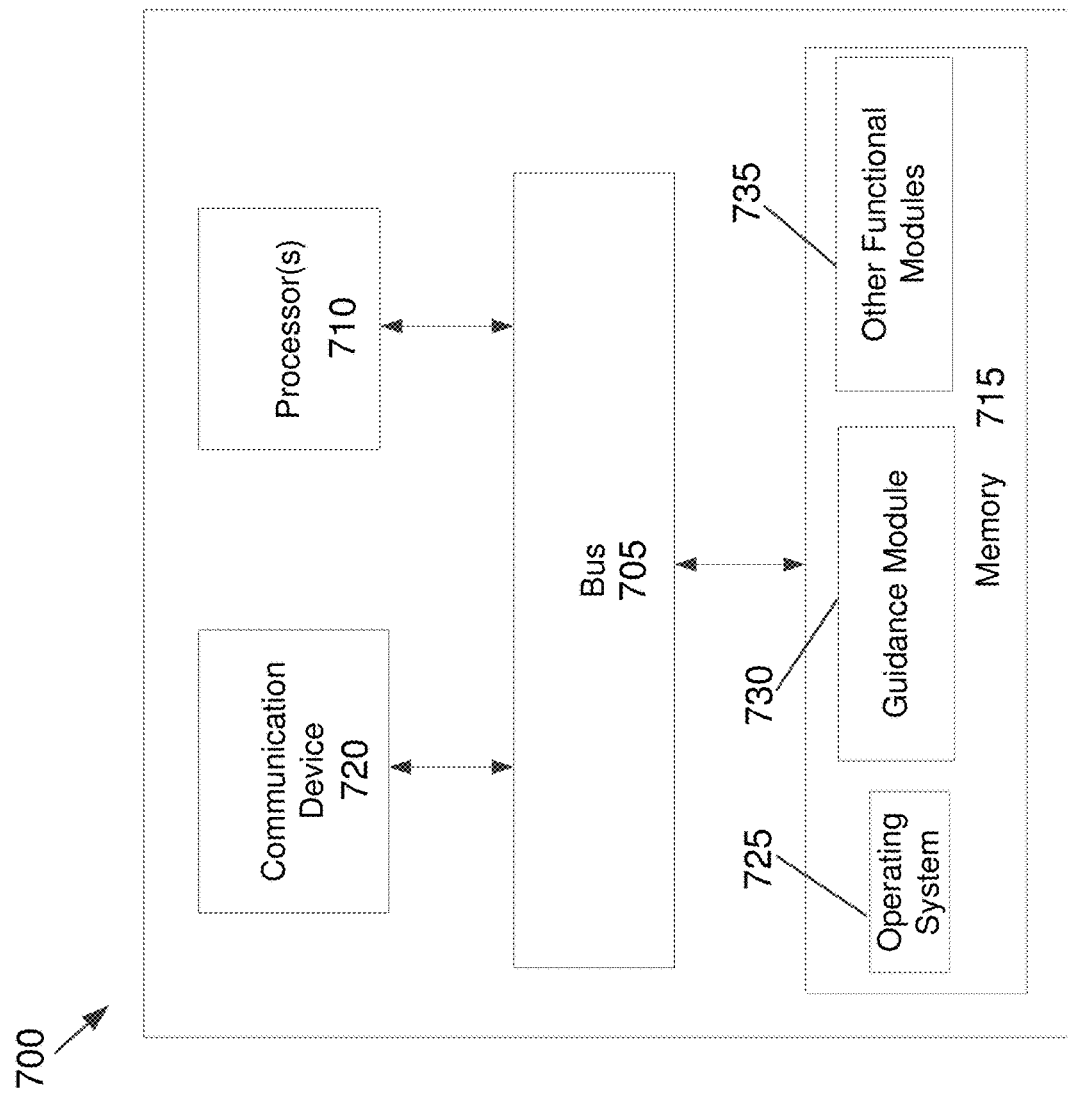

SYSTEM FOR IMPARTING LINEAR MOMENTUM TRANSFER FOR HIGHER ORBITAL INSERTION

CROSS REFERENCE TO RELATED APPLICATION

This application is a continuation-in-part of, and claims priority to, U.S. patent application Ser. No. 14/973,793 filed Dec. 18, 2015, which is a continuation of U.S. patent application Ser. No. 13/963,025 filed Aug. 9, 2013, now issued as U.S. Pat. No. 9,260,204, which issued on Feb. 16, 2016. The subject matter of these earlier filed applications is hereby incorporated by reference in its entirety.

FIELD

The present invention generally pertains to inserting space vehicles into higher orbits, and more specifically, to a system that is configured to impart a linear momentum transfer from a tether to a target space vehicle.

BACKGROUND

The amount of expendable hardware required to place a satellite in orbit is the primary cost driver for access to space. Specific impulse ($I_{sp}$) is one of the major factors determining the size of the vehicle required to accelerate a spacecraft to orbital velocity. The specific impulse of rocket propulsion is typically limited to approximately 450 seconds. Air breathing hypersonic propulsion systems, such as scramjets, have much higher specific impulses and have been proposed for space transportation, but have proven to be impractical due to their limited thrust potential.

Because scramjet propulsion has low thrust and must operate within the atmosphere, gravity and drag losses are high. Under these conditions, rocket propulsion is more efficient. Electric propulsion has a higher $I_{sp}$ (3,000 seconds or more), but has considerably lower thrust. As a result, electric propulsion cannot be directly employed as an ascent propulsion system.

Rotorvators have been proposed to propel a payload into a higher orbit. The rotorvator tether system is placed in an elliptical orbit and its rotation is timed so that the tether is oriented vertically below the central facility and swinging backwards when the system reaches perigee. At that point, a grapple mechanism located at the tether tip can rendezvous with and capture the payload, which is moving in either a lower orbital trajectory or a suborbital trajectory. Half a tether rotation later, the tether releases the payload, tossing it into a higher energy orbit.

Rotorvators require the tether to rotate about a massive central body. The purpose of the tether in a rotorvator concept is to transmit the centripetal force that keeps the payload in its circular motion around the rotorvator. As such, the tether does not bend. The acceleration of the target using a rotavator depends on the rotational rate of the tether and the mass of the central body.

However, rotorvator systems are complex and difficult to implement. Accordingly, an improved tether-based system may be beneficial.

SUMMARY

Certain embodiments of the present invention may be implemented and provide solutions to the problems and needs in the art that have not yet been fully solved by conventional space systems. For example, some embodiments of the present invention pertain to a catching mechanism of a target space vehicle and a tether that is configured to impart a linear momentum transfer from the tether to the target space vehicle. The tether may be fixedly or detachably connected to a Kinetic Energy Storage and Transfer (KEST) vehicle that maneuvers via thrusters and potentially retrieves the tether. In some embodiments, the tether may be separate from the KEST vehicle and may be retrieved by a suitable retrieving mechanism, such as a robotic arm.

In one embodiment, a system includes a KEST vehicle that includes circuitry and a plurality of thrusters. The system also includes a tether operably connected to or retrievable by the KEST vehicle. The tether includes a contact mechanism. The system further includes a target space vehicle that includes a catching mechanism configured to receive the contact mechanism of the tether. The catching mechanism includes webbing of sufficient length, width, weaving, and material such that the contact mechanism is traveling at a same speed as the target space vehicle before or by the time the contact mechanism rips through some or all of the webbing. The KEST vehicle is configured to position the tether for contact with the target space vehicle.

In another embodiment, a tether includes a contact mechanism configured to be received by a catching mechanism of a target space vehicle. The tether also includes a beacon configured to emit a beacon signal.

In yet another embodiment, a target space vehicle includes a catching mechanism configured to receive a contact mechanism of a tether. The catching mechanism includes webbing of sufficient length, width, weaving, and material such that the contact mechanism is traveling at a same speed as the target space vehicle before or by the time the contact mechanism rips through some or all of the webbing.

In still another embodiment, a KEST vehicle includes circuitry and a plurality of thrusters. The circuitry of the KEST vehicle is configured to receive a beacon signal from a tether, process the beacon signal, determine adjustments for the KEST vehicle, and fire one or more of the plurality of thrusters such that the KEST vehicle can intercept the tether.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A is a perspective view illustrating a target space vehicle with a movable catching mechanism prior to contact with a tether, according to an embodiment of the present invention.

FIG. 2B is a perspective view illustrating the target space vehicle with the movable catching mechanism of FIG. 2A after contact with the tether, according to an embodiment of the present invention.

FIG. 3A is a side view illustrating a tether, according to an embodiment of the present invention.

FIG. 3B is a side cutaway view illustrating a cable of the tether, according to an embodiment of the present invention.

FIG. 4 is a perspective view illustrating a KEST vehicle with an affixed tether, according to an embodiment of the present invention.

FIG. 5 is a perspective view illustrating a KEST vehicle with an unattached tether, according to an embodiment of the present invention.

FIG. 6 is a flowchart illustrating a process for inserting a target space vehicle into a higher energy orbit, according to an embodiment of the present invention.

FIG. 7 is a block diagram illustrating a computing system of a space vehicle, according to an embodiment of the present invention.

DETAILED DESCRIPTION OF THE EMBODIMENTS

Figure 1:
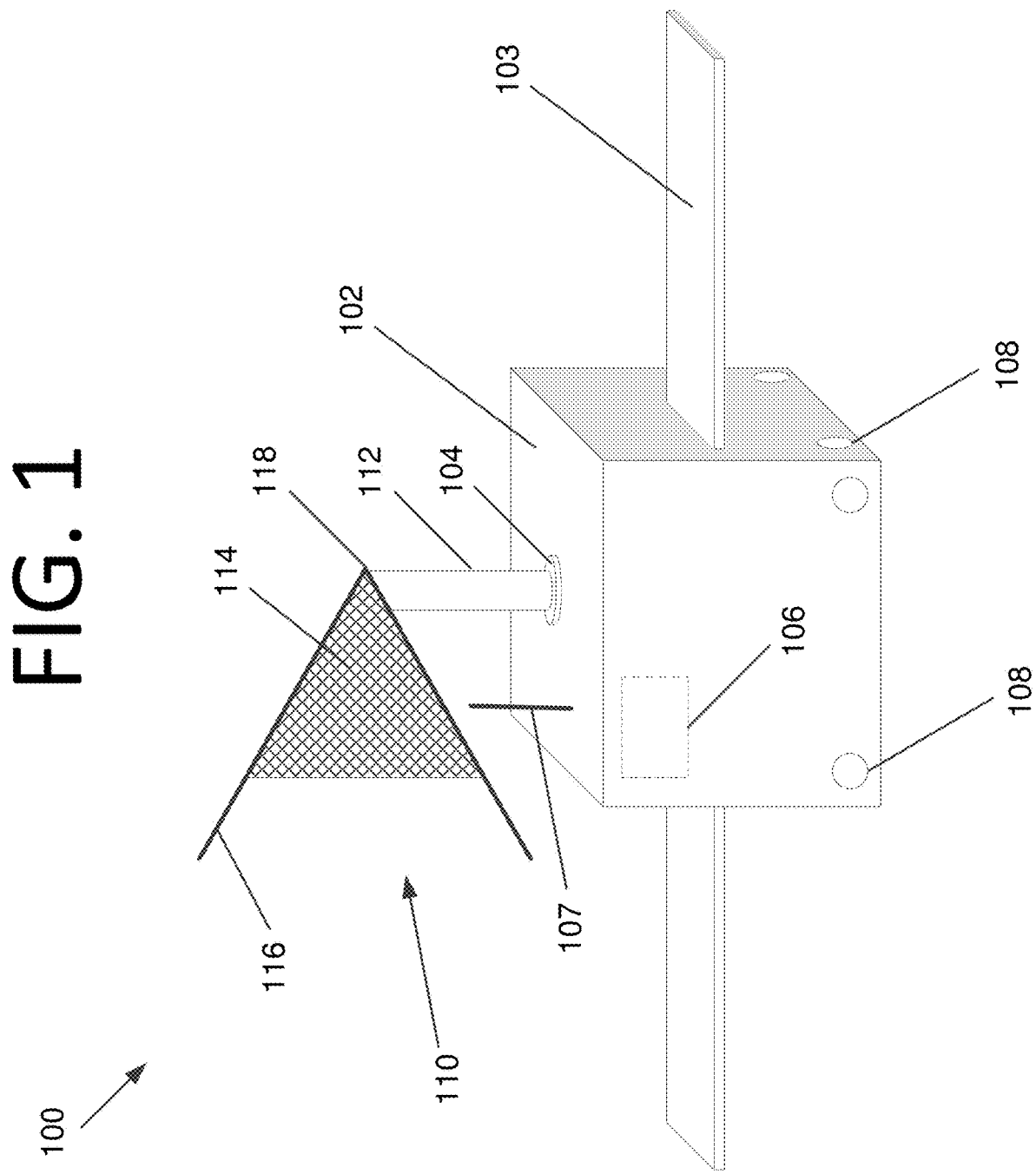
FIG. 1 is a perspective view illustrating a target space vehicle with a fixed catching mechanism, according to an embodiment of the present invention.

Some embodiments of the present invention pertain to a catching mechanism of a target space vehicle and a tether that is configured to impart a linear momentum transfer from the tether to the target space vehicle. The tether may be fixedly or detachably connected to a Kinetic Energy Storage and Transfer (KEST) vehicle that maneuvers and potentially retrieves the tether. In some embodiments, the tether may be separate from the KEST vehicle and may be retrieved by a suitable retrieving mechanism, such as a robotic arm.

The catching mechanism may have webbing (i.e., a mesh) made from a high strength material suitable to enable the catching mechanism and target vehicle to survive contact with a suitable corresponding end member of the tether (e.g., a hook, a grapple, or any other suitable mechanism without deviating from the scope of the invention). In some embodiments, rather than being rigid (see FIG. 1), the catching mechanism may include pivot points on a support member (see FIGS. 2A and 2B) so the catching mechanism can be initially deployed perpendicular to the trajectory of the target space vehicle and then pivot into the trajectory path after contact. In some embodiments, one or more of the pivot points may provide some resistance, absorbing some of the force due to the difference in speed of the tether and the target space vehicle.

The KEST vehicle may maneuver the tether into an orientation and orbit where an end of the tether will make contact with the catching mechanism of the target space vehicle. The target space vehicle may make adjustments as it approaches the tether to maneuver itself into position if further positional and/or orientation adjustments are required. In some embodiments, the tether may include a beacon mechanism (e.g., a transmitter) that emits a beacon signal to assist the target space vehicle in this positioning.

The hook or other contact mechanism of the tether begins to tear through the webbing on contact. By the time this mechanism has torn through some or all the webbing, the end of the tether with the hook or other contact mechanism and the target space vehicle should be traveling at the same velocity. The tether bends during the linear momentum transfer process, and as the bend progresses, the target space vehicle will speed up and incremental sections of the tether where the bend is forming will slow down.

In releasable embodiments, the end of the tether opposite the contact mechanism may include a retrieval mechanism (e.g., a ring, ellipse, or any another suitable mechanism) via which the tether can be retrieved by the KEST vehicle. The KEST vehicle may retrieve the tether via a robotic arm, for instance, that is manipulated to catch the ring of the tether. The tether may contain internal wiring that allows the KEST vehicle to charge the beacon mechanism of the tether via its own internal power source. In such embodiments, the KEST vehicle may connect a corresponding charging connector of the tether to a port or other charging mechanism of the KEST vehicle. Alternatively, the tether may have a solar power source or a battery with a relatively long life.

The transfer of linear momentum will be nonlinear over a tether of uniform thickness since there is a high difference in velocity initially that is then progressively less over time as the tether bends and the target space vehicle speeds up. If a more uniform, or entirely uniform, linear momentum transfer is desired, the tether may be tapered such that it is thinner at the contact mechanism end and thicker towards the end that connects to, or is grabbed by, the KEST vehicle. This may lead to less force being applied to the target space vehicle, which may allow it to be less structurally robust and include more sensitive/delicate components. After the target space vehicle achieves the desired velocity, it releases the catching mechanism and/or the tether.

With solid state devices, a beacon mechanism can be produced that is strong enough to withstand the initial impact of the contact mechanism and the catching mechanism. For instance, control electronics have been integrated into intelligent artillery shells that survive the exceptional acceleration forces that are applied to the shell when it is fired (often in excess of 8,000 g). Such technology could be applied to the tether in some embodiments. In certain embodiments, the initial acceleration force may be 100 g or less, which is more easily survivable by the tether and target space vehicle alike. However, in some embodiments, greater initial acceleration forces may be accommodated.

Once the tether has been released by the target space vehicle, it should be in a lower energy orbit than the KEST vehicle, assuming that the KEST vehicle has not modified its orbit. The KEST vehicle may then use a suitable propulsion system (e.g., a solar electric propulsion system, a chemical propulsion system, any other suitable propulsion system, or any combination of propulsion systems) to lower its perigee altitude until it encounters slight atmospheric drag. If chemical propulsion is used, the KEST vehicle may be refuellable in some embodiments. The atmospheric drag will begin to lower the apogee of the KEST vehicle until it is close to the orbit of the tether. Using its propulsion system, the KEST vehicle may approach the tether. Using a grappling arm or other suitable mechanism, the KEST vehicle may then capture an end of the tether (the end of the tether with the contact mechanism or the opposite end). Using its propulsion system, the KEST vehicle may take the captured tether to a higher energy elliptical orbit and position the tether in preparation for contact with the next target space vehicle. To position the tether, the KEST vehicle may slow itself using its propulsion system, causing the tether to straighten out. When the tether is positioned for the next contact, it may be released by the KEST vehicle, and the process described above may repeat.

The formula for calculating the mass of the tether in some embodiments is given by:

$$M_{tether} = M_{target} \frac{(V_{desired} - V_{target_1})}{(V_{KEST_1} - V_{desired})} \quad (1)$$

where $M_{tether}$ is the mass of the tether, $M_{target}$ is the mass of the target, $V_{desired}$ is the desired target velocity, $V_{target_1}$ is the initial target velocity, and $V_{KEST_1}$ is the initial KEST vehicle velocity when it is operably connected to the tether. In some embodiments, the KEST vehicle may be traveling at speeds in excess of 30,000 feet per second, the difference in speed between the KEST vehicle may be 6,000 to 15,000 feet per second or more, and the tether length for a 100 g momentum transfer may be 15,000 feet. However, any suitable speed difference, tether length, and/or momentum transfer force may be used without deviating from the scope of the invention. For a survivable interaction at a speed difference of 6,000 feet per second in some embodiments, approximately four feet of webbing may be used on the catching mechanism given the strength of existing materials. It should also be noted that a longer length tether, and/or a tether that is thinner towards the end that contacts the catching mechanism, may be used to reduce the G-forces applied to the target space vehicle and the tether.

Consider an example using Eq. (1) above where one wishes to accelerate a 5,500 pound target from 26,000 feet per second to 32,000 feet per second, and the KEST vehicle/tether have an initial velocity of 36,000 feet per second. In that case, $$M_{tether} = 5,500 * \left( \frac{(32,000 - 26,000)}{(36,000 - 32,000)} \right) = 5,500 * \left( \frac{6,000}{4,000} \right) = 5,500 * 1.5 = 8,250.$$

Thus, in this case, $M_{tether}$=8,250 pounds.

To determine the tether length, the weight of the tether per foot $T_{SW}$ may be determined. For instance, a certain synthetic woven fabric (e.g., Kevlar®) cable with a diameter of 0.375 inches may have a $T_{SW}$ of 0.037 pounds per foot. The length of the tether $L_{tether}$ may be determined by:

$$L_{tether} = \frac{M_{tether}}{T_{SW}} \quad (2)$$

Accordingly, in this example, $L_{tether}$ would be 223,000 feet to accomplish the desired acceleration.

FIG. 1 is a perspective view illustrating a target space vehicle 100 with a fixed catching mechanism 110, according to an embodiment of the present invention. In this embodiment, target space vehicle 100 is an orbital space vehicle that includes a body 102, solar panels 103, internal circuitry 106 (e.g., a processor, circuit board, transmitter, receiver, and any other suitable circuitry used for space vehicles), and an antenna 107 that is operably connected to circuitry 106. Circuitry 106 may receive and process beacon signals from a tether (not shown) via antenna 107 in order to affect positional adjustments using thrusters 108. Target space vehicle 100 also includes an attachment member 104 that attaches to catching mechanism 110 via a support member 112. Target space vehicle 100 may be any suitable shape, size, and type of space vehicle without deviating from the scope of the invention. Indeed, the cubic shape of target space vehicle 100 in FIG. 1 does not imply that target space vehicle 100 must necessarily be a cubesat.

Support member 112 releasably attaches to attachment member 104 located on body 102 in this embodiment such that catching mechanism 110 can be released from target space vehicle 100 after it is no longer needed. Attachment member 104 may attach to support member by mechanical grips, a threaded connection (e.g., a screw-type connection), a solid connection that is released by explosive charges or cutting support member 112 free via a plasma cutter, a raiseable connection where support member 112 extends through attachment member 104 into the inside of body 102 and release is achieved by raising support member 112, or any other suitable mechanism without deviating from the scope of the invention. However, in some embodiments, support member 112 may be fixedly attached to target space vehicle 100.

Catching mechanism 110 also includes webbing 114 that is attached to tangs 116. Tangs may be constructed from metals, alloys, carbon fiber, or any other suitable material or combination of materials without deviating from the scope of the invention. In this embodiment, tangs 116 form a "V" shape with a closed end 118. Webbing 114 is constructed from high strength material including, but not limited to, carbon fiber composites, graphene, woven fabrics of synthetic fiber (e.g., Kevlar® and/or Spectra®), or any other suitable material or combination of materials without deviating from the scope of the invention.

A suitable amount of webbing 114 is provided to accommodate the anticipated difference in speed between the tether (not shown) and target space vehicle 100. More specifically, a sufficient length, width, weaving, and material are selected such that the corresponding structure on one end of the tether, such as a hook, is traveling at the same speed as target space vehicle 100 before or by the time the hook rips through webbing 114 and comes to closed end 118 of catching mechanism 110. This difference in speed may be over 1,000 feet per second in some embodiments, but any desired speed difference may be accommodated without deviating from the scope of the invention.

FIG. 2A is a perspective view illustrating a target space vehicle 200 with a movable catching mechanism 210 prior to contact with a tether 220, according to an embodiment of the present invention. Target space vehicle 200 is shown here as a cylinder, but target space vehicle 200 may have any suitable regular or irregular shape, and any desired form factor, without deviating from the scope of the invention. Catching mechanism 210 includes a support member 212 and rotating pivot points 214, 215. Pivot point 214 connects support member 212 to target space vehicle 200 and pivot point 215 connects support member 212 to tangs 216 and webbing 218 (or alternatively, just to tangs 216). In some embodiments, multiple support members and three or more pivot points may be included. Pivot points 214, 215 may be motorized in some embodiments, and the range of motion thereof may be limited (e.g., to 90°) to help facilitate a perpendicular and parallel orientation.

Tether 220 includes a hook 222 at one end (the other end of tether 220 is not shown here). However, any suitable contact mechanism configured to engage the catching mechanism may be used without deviating from the scope of the invention. For instance, a grapple may be used in some embodiments, which may make orientation of the contact mechanism to engage the catching mechanism easier. Tether 220 may be constructed from carbon fiber composites, graphene, woven fabrics of synthetic fiber (e.g., Kevlar™ and/or Spectra™), or any other suitable material or combination of materials without deviating from the scope of the invention. In practical implementations, tether 220 would likely be quite long, and could have any desired length. For instance, tether 220 could have a length of several or dozens of miles.

FIG. 2B is a perspective view illustrating target space vehicle 200 with movable catching mechanism 210 after contact with tether 220, according to an embodiment of the present invention. After contacting webbing 216, hook 222 begins to rip through webbing 218, leaving a tear 219. Support member 212 pivots about pivot points 214, 215 such that it is positioned parallel to the trajectory of target space vehicle 200. Pivot point 215 is configured such that tangs 216 maintain their orientation. Once contact is made, forces acting on pivot points 214, 215 may cause them to align with a trajectory axis and velocity vector of target space vehicle 200.

After hook 222 contacts webbing 218, a bend 224 begins to form in tether 220. As progressive incremental sections 226 of tether 220 bend, linear momentum is transferred from tether 220 to target space vehicle 200. Bend 224 propagates along tether 220 in a direction opposite the initial trajectory of tether 220 as sections 226 of tether 220 that were previously traveling at the initial speed of tether 220 slow. This accelerates catching mechanism 210, and thus, target space vehicle 200 and imparts linear momentum thereto. By the time bend 224 reaches the end (not shown) of tether 220 opposite hook 222, target space vehicle 200 has achieved the desired velocity increase. Hook 220 may then be released by rotating pivot point 215. Alternatively, pivot point 214 may detach, releasing catching mechanism 210 from target space vehicle 200.

FIG. 3A is a side view illustrating a tether 300, according to an embodiment of the present invention. Tether 300 may be constructed from high strength woven fabric, carbon fiber composites, metals or alloys, any other suitable high strength material, or any combination thereof, without deviating from the scope of the invention. Tether 300 includes a cable 310 that includes a beacon 320 with an internal transmitter 322 and a power source 324. Power source 324 may be a battery with or without corresponding solar panels. A hook 330 is attached to beacon 320. However, in some embodiments, hook 330 may be attached directly to cable 310. A ring 340 enables tether 300 to be retrieved by a KEST vehicle (not shown). A charging connector 350 allows power from the KEST vehicle to be used to charge power source 324. However, in some embodiments, tether 300 may supply its own power for beacon 320.

In this embodiment, cable 310 is tapered, being thinner towards hook 330 and thicker towards ring 340. The taper of cable 310 and the sizes of the components of tether 300 are greatly exaggerated here for illustration purposes. In practical embodiments, the taper would be slight, and cable 310 would be long (e.g., miles or dozens of miles).

FIG. 3B is a side cutaway view illustrating cable 310, according to an embodiment of the present invention. Cable 310 includes a cladding 312 that may shield internal components of cable 310 from radiation. Polyimides, for example, deteriorate when exposed to ultraviolet radiation. Using a suitable material for cladding 312, such as a polytetrafluoroethylene (PTFE) material (e.g., Teflon®), may reduce or eliminate such damage if core 314 contains polyimides. A core 314 provides strength and mass for cable 310. An internal conductor 316 (e.g., a wire) connects charging connector 350 to power source 324. In some embodiments, no cladding may be present, and in certain embodiments, the cable lacks an internal conductor, reducing complexity, and possibly cost.

FIG. 4 is a perspective view illustrating a KEST vehicle 400 with an affixed tether 410, according to an embodiment of the present invention. In this embodiment, KEST vehicle 400 is an orbital space vehicle that includes a body 402, internal circuitry 406 (e.g., a processor, circuit board, transmitter, receiver, and any other suitable circuitry used for space vehicles), and an antenna 407 that is operably connected to circuitry 406. However, KEST vehicle 400 may be any suitable shape, size, and type of space vehicle without deviating from the scope of the invention. Indeed, the cubic shape of KEST vehicle 400 does not imply that KEST vehicle 400 must necessarily be a cubesat.

Circuitry 406 may receive and process beacon signals from a distal end of tether 410 via antenna 407 in order to determine where the end of tether 410 is and to perform adjustments to alter the position of tether 410 (e.g., cause tether 410 to splay out) using thrusters 408. KEST vehicle 400 also includes an attachment member 408 that attaches tether 410 to KEST vehicle 400. In some embodiments, tether 410 may be releasable from KEST vehicle 400 via attachment member 408.

FIG. 5 is a perspective view illustrating a KEST vehicle 500 with a robotic arm 510 and an unattached tether 520, according to an embodiment of the present invention. Similar to KEST vehicle 400 of FIG. 4, KEST vehicle 500 is an orbital space vehicle that includes a body 502, an attachment member 504, internal circuitry 506 (e.g., a processor, circuit board, transmitter, receiver, and any other suitable circuitry used for space vehicles), an antenna 507 that is operably connected to circuitry 506, and thrusters 508. However, rather than having a physically attached tether, KEST vehicle 500 includes a robotic arm 510 that is connected to KEST vehicle 500 via attachment member 508 and a dock 530 for securing tether 520. KEST vehicle 500 may also be any suitable shape, size, and type of space vehicle without deviating from the scope of the invention.

Robotic arm 510 includes rigid segments 512 and motorized pivot points 514 that form a rotating joint between corresponding rigid segments 512. In some embodiments, pivot points 514 may be ball joints capable of rotating in any desired direction that is limited only by the location of segments 514 and body 502. In certain embodiments, robotic arm 510 rotates about attachment member 508 in any desired manner.

Robotic arm 510 also includes a hand or claw 516 that includes a plurality of fingers 518. Hand or claw 516 is capable of rotating about its own pivot point 514, and each finger has segments 518 and joints about which connected segments rotate. Robotic arm 510 is capable of retrieving tether 520 via a ring 522 (or any other suitable mechanism in some embodiments). Robotic arm 510 may then position ring 522 so as to be secured by dock 530 via a grapple 534. Dock 530 is connected to body 502 via support member 532. Once tether 520 is secured, robotic arm 510 may insert electrical connector 524 into electrical port 509 to charge a battery (not shown) of tether 520.

Circuitry 506 may receive and process beacon signals from tether 520 via antenna 507 in order to determine the location of tether 520 and to retrieve it via ring 522. Once tether 520 has accelerated, and subsequently been released by, a target space vehicle (not shown), tether 520 should be in a lower energy orbit than KEST vehicle 500, assuming that KEST vehicle 500 has not modified its orbit in the interim. KEST vehicle 500 may then use thrusters 508 to lower its perigee altitude until KEST vehicle 500 encounters slight atmospheric drag. The atmospheric drag will begin to lower the apogee of KEST vehicle 500 until it is close to the orbit of tether 520. Using thrusters 508, KEST vehicle 500 may approach tether 520. Using robotic arm 510, KEST vehicle 500 may then capture ring 522 or a contact mechanism (not shown) of tether 520. In some embodiments, capturing the contact mechanism may allow for more accurate and careful positioning of the contact mechanism for contact with the next target space vehicle. In such embodiments, no ring or other mechanism may be present at the other end of the tether.

Using thrusters 504, KEST vehicle 500 may take captured tether 520 to a higher energy elliptical orbit and position tether 520 in preparation for contact with the next target space vehicle. To position tether 520, KEST vehicle 500 may slow itself using thrusters 508, causing tether 520 to straighten out along the trajectory of KEST vehicle 500. When tether 520 is positioned for the next contact, KEST vehicle 500 may release tether 520 via robotic arm 510.

KEST vehicles 400 and 500 may have solar panels (not shown), which may be similar to solar panels 103 in FIG. 1 in some embodiments. In some embodiments, some or all of thrusters 408, 504 may use electric propulsion which has a relatively high $I_{sp}$. Power for the electric propulsion may be provided via the solar panels and store in an internal battery.

FIG. 6 is a flowchart 600 illustrating a process for inserting a target space vehicle into a higher energy orbit, according to an embodiment of the present invention. The process begins with positioning a tether in a desired orientation and orbit at 610. More specifically, the tether may be accelerated, splayed out, and placed in an orbit where it will subsequently make contact with a target space vehicle. The target space vehicle is then launched at 620 into a sub-orbital or lower orbital trajectory than the tether such that the paths of the two will approximately meet. For instance, in some embodiments, the orbit of the tether and target space vehicle may be such that the target space vehicle makes contact with the tether while the target space vehicle is at or near its apogee and the tether is at or near its perigee. As the target space vehicle approaches the tether, the target space vehicle makes positional/orientation adjustments at 630, if needed. These adjustments may be assisted by a beacon signal from the tether in some embodiments.

The target space vehicle than "catches" a hook, grapple, or other suitable mechanism on the tether using a catching mechanism at 640. In some embodiments, the catching mechanism includes a mesh of high strength woven fabric webbing that tears after making contact with the hook, slowing the end of the tether with the hook and accelerating the target space vehicle. By the time the hook has torn through some or all of the mesh, the target space vehicle and the end of the tether with the hook will be traveling at the same speed. The target space vehicle continues to be accelerated at 650 to the desired speed as the tether bends and incremental sections of the tether impart linear momentum transfer to the target space vehicle.

Once the target space vehicle reaches the desired speed, the tether (and potentially the catching mechanism as well) is released at 660. The KEST vehicle then maneuvers itself to a lower orbit where it will intercept the tether at 670. The KEST vehicle then uses a robotic arm or any other suitable mechanism to retrieve the tether. The process then proceeds to 610 and is repeated.

FIG. 7 is a block diagram illustrating a computing system 700 (hereinafter "system") of a space vehicle, according to an embodiment of the present invention. System 700 includes a bus 705 or other communication mechanism for communicating information, and processor(s) 710 coupled to bus 705 for processing information. Processor(s) 710 may be any type of general or specific purpose processor, including a central processing unit (CPU) or application specific integrated circuit (ASIC). System 700 further includes a memory 715 for storing information and instructions to be executed by processor(s) 710. Memory 715 can be comprised of any combination of random access memory (RAM), read only memory (ROM), flash memory, cache, static storage such as a magnetic or optical disk, or any other types of non-transitory computer-readable media or combinations thereof. Additionally, system 700 includes a communication device 720, such as a transceiver, to wirelessly communicate with external systems.

Non-transitory computer-readable media may be any available media that can be accessed by processor(s) 710 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 715 stores software modules that provide functionality when executed by processor(s) 710. The modules include an operating system 725 for system 700. The modules further include a guidance module 730 that is configured to control position, trajectory, and speed of a KEST vehicle or a target space vehicle, as well as to process beacon signals from a tether. For instance, guidance module 730 may be configured to perform any of the positioning operations discussed herein for its respective vehicle. System 700 may include one or more additional functional modules 735 that include additional functionality.

One skilled in the art will appreciate that a "system" could be embodied as a computer, a server, a console, or any other suitable computing device, or combination of devices. However, in many embodiments, system 700 will be implemented as electronics and software of a vehicle control system. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a Kinetic Energy Storage and Transfer (KEST) vehicle comprising circuitry and a plurality of thrusters;
a tether operably connected to or retrievable by the KEST vehicle, the tether comprising a contact mechanism; and
a target space vehicle comprising a catching mechanism configured to receive the contact mechanism of the tether, the catching mechanism comprising webbing of sufficient length, width, weaving, and material such that the contact mechanism is traveling at a same speed as the target space vehicle before or by the time the contact mechanism rips through some or all of the webbing, wherein
the KEST vehicle is configured to position the tether for contact with the target space vehicle, and
the tether is configured to bend after the contact mechanism of the tether makes contact with the catching mechanism of the target space vehicle, and as the bend progresses, the target space vehicle speeds up and incremental sections of the tether where the bend is forming slow down, thereby transferring linear momentum of the tether to the target space vehicle.

2. The system of claim 1, wherein the target space vehicle further comprises:
a plurality of thrusters; and
circuitry configured to receive a beacon signal from the tether, process the beacon signal, determine adjustments for the target space vehicle, and fire one or more of the plurality of thrusters such that the catching mechanism is maneuvered to make contact with the contact mechanism of the tether.

3. The system of claim 1, wherein the catching mechanism further comprises:
a pair of tangs that are attached to the webbing and form a "V", wherein
the contact mechanism of the tether is configured to enter an open end of the "V" and to tear the webbing towards a closed end of the "V".

4. The system of claim 3, wherein the catching mechanism further comprises a support member connected to the tangs at one end and connected to the target space vehicle at another end.

5. The system of claim 4, wherein the connection between the support member and the target space vehicle is achieved via an attachment member configured to release the catching mechanism from the target space vehicle.

6. The system of claim 1, wherein the contact mechanism comprises a hook.

7. The system of claim 1, wherein the catching mechanism further comprises:
one or more support mechanisms; and
at least two pivot points connecting a support mechanism of the one or more support mechanisms to a body of the target space vehicle, to another support mechanism of the one or more support mechanisms, or to the catching mechanism, wherein
the one or more support mechanisms are configured to move from an orientation that is perpendicular to a trajectory of the target space vehicle to an orientation that is parallel to the trajectory of the target space vehicle after the catching mechanism of the target space vehicle makes contact with the contact mechanism of the tether.

8. The system of claim 1, wherein
the tether is retrievable by the KEST vehicle, and
the tether further comprises a retrieval mechanism by which the tether can be retrieved by the KEST vehicle.

9. The system of claim 8, wherein the retrieval mechanism comprises a ring shape or an elliptical shape.

10. The system of claim 1, wherein the tether further comprises a beacon configured to emit a beacon signal that may be received by the KEST vehicle, the target space vehicle, or both.

11. The system of claim 10, wherein the tether further comprises:
   a power source configured to power the beacon;
   a charging connector; and
   a conductor operably connecting the power source to the charging connector.

12. The system of claim 1, wherein the tether is tapered such that the tether becomes progressively wider from an end proximate to the contact mechanism to an end opposite the contact mechanism.

13. The system of claim 1, wherein the circuitry of the KEST vehicle is configured to receive a beacon signal from the tether, process the beacon signal, determine adjustments for the KEST vehicle, and fire one or more of the plurality of thrusters such that the KEST vehicle can intercept the tether.

14. The system of claim 1, wherein the tether is retrievable by the KEST vehicle and the KEST vehicle further comprises:
   a robotic arm configured to retrieve an end of the tether.

15. The system of claim 1, wherein the KEST vehicle further comprises:
   a docking station configured to secure the tether to the KEST vehicle; and
   a charging port configured to receive a charging connector of the tether and provide power to the tether.

16. The system of claim 1, wherein the tether has a length of at least a mile.

* * * * *